United States Patent

[11] 3,620,252

[72] Inventors Heinz Topfer;
 Manfred Rockstroh, both of Dresden, Germany
[21] Appl. No. 881,688
[22] Filed Dec. 3, 1969
[45] Patented Nov. 16, 1971
[73] Assignee VEB Reglerwerk Dresden
 Dresden, Germany
 Continuation-in-part of application Ser. No. 630,064, Apr. 11, 1967, now abandoned. This application Dec. 3, 1969, Ser. No. 881,688

[54] PNEUMATIC THRESHOLD SWITCH WITH ADJUSTABLE THRESHOLD LEVEL
 6 Claims, 2 Drawing Figs.

[52] U.S. Cl. ................................................... 137/625.6
[51] Int. Cl. .................................................... F16k 11/02
[50] Field of Search ........................................ 137/625.66, 596.18, 625.6; 251/28

[56] References Cited
UNITED STATES PATENTS

| | | | |
|---|---|---|---|
| 1,912,447 | 6/1933 | Gray | 137/625.66 UX |
| 3,107,693 | 10/1963 | Puster et al. | 137/625.66 |
| 3,326,239 | 6/1967 | Saint Joanis et al. | 137/625.66 |
| 3,415,282 | 12/1968 | Zoludow | 251/28 X |
| 3,495,611 | 2/1970 | Topfer | 137/625.66 X |

*Primary Examiner*—M. Cary Nelson
*Assistant Examiner*—Richard Rothman
*Attorney*—Nolte and Nolte

ABSTRACT: A pneumatic threshold switch comprises a pneumatic pressure release switch for producing a pneumatic binary signal when actuated, and a pneumatic servomotor. The pneumatic servomotor comprises a housing, a chamber, a servo diaphragm in the servo chamber, a servo piston affixed at one end thereof to the servo diaphragm and actuating at the other end thereof the pressure release switch, and a threshold level adjuster for applying an adjustable threshold level force to the servo piston surface of the servo diaphragm. The threshold switch is released by increasing the pressure in the servo chamber above the preadjusted threshold level force.

HEINZ TÖPFER
MANFRED ROCKSTROH
INVENTORS

PNEUMATIC THRESHOLD SWITCH WITH ADJUSTABLE THRESHOLD LEVEL

This is a continuation-in-part application of the patent application Ser. No. 630,064, filed on Apr. 11, 1967, now abandoned.

The present invention relates to a pneumatic threshold switch. More particularly, the invention relates to a pneumatic threshold switch with an adjustable threshold level. The pneumatic threshold switch of the present invention produces a pneumatic binary signal when a pneumatic input exceeds or is less than the threshold level.

DESCRIPTION OF THE PRIOR ART

Pneumatic threshold switches, often also referred to as limit switches, may comprise electrical components, and thus produce only electric signals. If such limit switches are utilized as pneumatic threshold switches, they must be provided with additional input and output transducers in order to transform the electric signals into pneumatic signals.

Other known types of pneumatic threshold switches comprise only one fixed switching point or switching range, due to unequally effective surfaces or areas of the double diaphragm. In such a threshold switch, however, the threshold level cannot be adjusted.

SUMMARY OF THE INVENTION

The principal object of the present invention is to provide a new and improved pneumatic threshold switch. The pneumatic threshold switch of the present invention has an adjustable threshold level and produces a pneumatic binary signal when a pneumatic input exceeds or is less than such threshold level. The pneumatic threshold switch of the present invention operates with efficiency, effectiveness and reliability. The pneumatic threshold switch of the present invention produces a pneumatic signal nonsequentially with great switching accuracy and negligible switching hysteresis between the switching positions when a pneumatic input is above or below the threshold level. The pneumatic threshold switch of the present invention is assembled from prefabricated components, has small dimensions, and may be used directly in pneumatic control or regulating systems without additional auxiliary devices.

In accordance with the present invention, a pneumatic threshold switch comprises a pneumatic pressure release switch for producing a pneumatic signal when actuated. A pneumatic servomotor is positioned in cooperative relation with the pneumatic pressure release switch. The servomotor comprises a housing, a servo chamber in the housing, a servo diaphragm in the servo chamber, a servo piston in the housing affixed to the servo diaphragm, and a threshold level adjuster for applying an adjustable threshold level force to the servo piston surface of the servo diaphragm.

The pneumatic pressure release switch comprises a base block and a pneumatic double diaphragm relay. The base block comprises a pressure input conduit, a pressure control chamber, a pressure outlet passage, a pressure relief aperture, and a switching piston disposed for free axial movement within the control chamber to seal the pressure relief aperture when pressure is applied into the control chamber; the pressure input conduit communicates with the pressure output conduit through the control chamber; the diaphragm relay has at least first and second relay chambers, separated from each other by a relay diaphragm; the first relay chamber is connected with the pressure control chamber through the pressure output passage; an output conduit of the relay is separated from the second relay chamber by a pressure seal seat controlled by the relay diaphragm; the pressure input conduit communicates also with the second relay chamber. A pressure input applies a switch force to the servo diaphragm in the servo chamber on the surface thereof opposite that to which the threshold level force is applied in a manner whereby upon the magnitude of the switch force exceeding the magnitude of the threshold level force, the servo piston actuates the pneumatic pressure release switch and the latter switch produces a pneumatic signal.

The threshold level adjuster may comprise a compression spring positioned on the servo piston with one end abutting a guide in the servo chamber for guiding the servo piston for axial movement and the other end abutting the servo diaphragm for applying a threshold level force to the servo piston surface of the servo diaphragm. A compression force adjuster adjusts the compression force of the compression spring on the servo diaphragm. The compression force adjuster may comprise a device for varying the distance between the guide and the servo diaphragm. The threshold level adjuster may comprise a servo pressure chamber on the servo piston side of the servo diaphragm between the guide and the servo diaphragm. A threshold pressure input applies an adjustable pneumatic threshold pressure input applies an adjustable pneumatic threshold level force to the servo piston surface of the servo diaphragm via the servo pressure chamber.

BRIEF DESCRIPTION OF THE DRAWING

In order that the present invention may be readily carried into effect, it will now be described with reference to the accompanying drawing, wherein.

DESCRIPTION OF THE PREFERRED EMBODIMENTS

Figure 1:
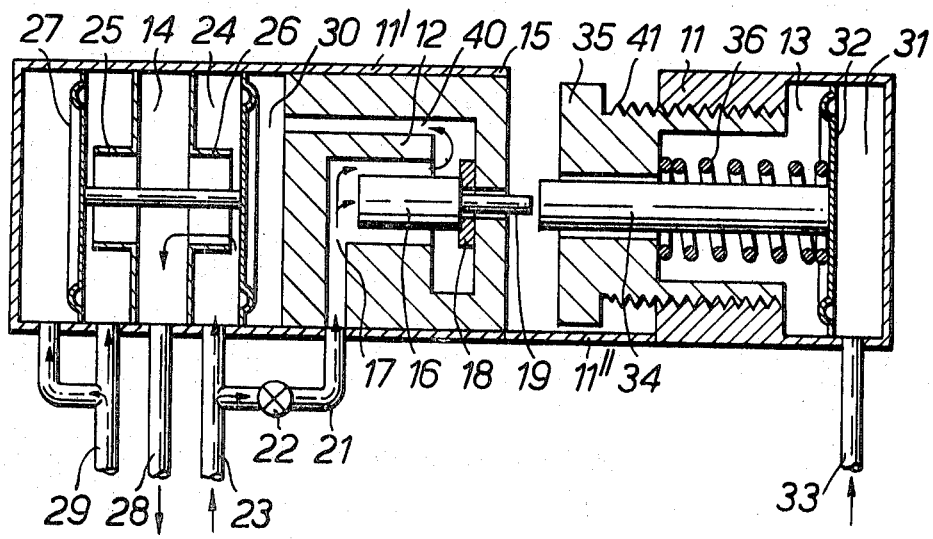
FIG. 1 is a schematic diagram, partly in section, of an embodiment of the pneumatic threshold switch of the present invention with a mechanically adjustable threshold level.

In the FIGS., the same components are identified by the same reference numerals.

Figure 2:
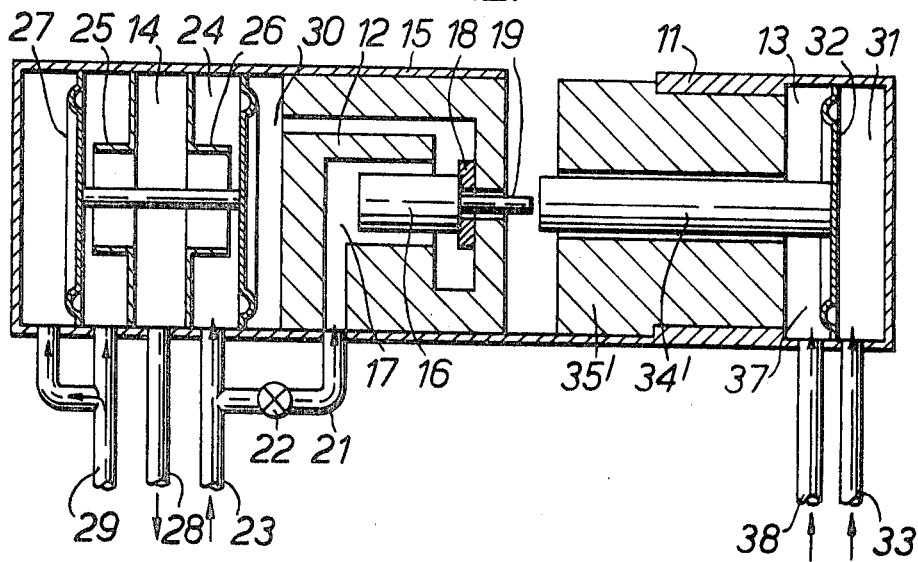
FIG. 2 is a schematic diagram, partly in section, of another embodiment of the pneumatic threshold switch of the present invention with a pneumatically adjustable threshold level.

In each of FIGS. 1 and 2, the pneumatic threshold switch is enclosed in housings 11 and 11', coaxially spaced one from another and connected by a coupling piece 11''.

The housing 11' encloses a pneumatic pressure release switch 12 and the housing 11 encloses a pneumatic servomotor 13.

The pneumatic pressure release switch 12 comprises a double diaphragm pneumatic relay 14 and a base block 15. The base block 15 includes a pressure actuated switch piston 16 which disposed for free axial movement in a control chamber 17 having greater diameter than that of the switch piston 16 and being formed in said base block 15 opposite to and axially with aperture 39. The switch piston 16 cooperates with a pressure seal seat 18 which is mounted in the pressure control chamber 17 around the pressure release aperture 39 and through which an extension arm 19 of said switch piston extends axially into operative proximity with actuating servo piston 34 of the pneumatic servomotor 13. The input of pressure control chamber 17 is connected by a conduit 21 via a valve or throttle 22 to an inlet conduit 23 opening into a second pressure chamber 24 in the pneumatic relay 14.

Pressure seal seats 25 and 26 and a double diaphragm 27 are provided in the second pressure chamber 24 of the double diaphragm pneumatic relay 14. An outlet conduit 28 opens out of the double diaphragm pneumatic relay 14 and an outlet 29 opens out of said double diaphragm pneumatic relay into the atmosphere. The first relay chamber 30 is provided between the double diaphragm 27 and the base block 15.

The servomotor 13 comprises a servo chamber 31. A servo diaphragm 32 is positioned in the servo chamber 31. An inlet conduit 33 opens into the servo chamber 31. In FIG. 1, a servo piston 34 is affixed to the servo diaphragm 32 and is movable mounted for axial movement in a guide 35 which by means of thread 41 is axially adjustable within the housing 11. The adjustment of the guide 35 can be made from the space between the housings 11' and 11.

A helical compression spring 36 is positioned around the servo piston 34 with one end abutting the guide 35 and the other end abutting the servo diaphragm.

The threshold level of the pneumatic threshold switch of FIG. 1 is mechanically adjustable by variation of the precompressive force of the compression spring 36. The precompressive force of the spring 36 may be varied by any suitable means such as, for example, by varying the axial distance between the facing surfaces of the guide 35 and the servo diaphragm 32 upon which said spring abuts. This variation of distance may be achieved by varying the axial length of the guide 35 by adding washers of different thickness to the spring-abutting surface of said guide or by moving said guide in thread 35' closer to or farther from the servo diaphragm 32.

The embodiment of FIG. 1 of the pneumatic threshold switch of the present invention operates as follows:

If compressed air or gas is supplied to the pressure input servo chamber 31 via the inlet conduit 33 of the servomotor 13, pressure is applied to the servo diaphragm 32. The pressure force applied to the servo diaphragm 32 acts against the force of the compression spring 36. If the pressure force applied to the servo diaphragm 32 is either greater or less than the force of the spring 36, the servo piston 34 is moved to the left or to supplied right, respectively, along its axis. When the servo piston 34 is moved to the left, it strikes the projecting extension arm 19 and moves the switch piston 16 of the pneumatic pressure release switch 12 away from the seal seat 18 so that said pressure release switch produces a pneumatic switching signal.

In FIG. 1, which shows the components of the threshold switch in the position immediately after opening the valve 22 in branch 21 of the inlet conduit 23. As marked by arrows, the switch piston 16 due to the pressure from the inlet conduit 23 is moved to the right against pressure seal seat 18 thereby providing a pressure seal of the first relay chamber 30 and of the pressure chamber 17 from the outer atmosphere. As a result, air or gas supplied to first relay chamber 30 via the pressure control chamber 17 and via the pressure output passage 40 maintains the switch piston 16 in its seated position and increases the pressure in the first relay chamber 30. Since the pressure in the second relay chamber 24 due to the open pressure seal seat 26 becomes lower than that in the first relay chamber 30, the diaphragm 27 is moved to the left and seals the pressure seal seat 26 so that a "zero" binary signal occurs and is maintained at the output conduit 28 of the pneumatic threshold switch of this invention.

If the pressure of the air or gas supplied to the servo chamber 31 via the inlet conduit 33 is greater than the threshold level, which is determined by the compressive force of the spring 36 on the servo diaphragm 32, said servo diaphragm is flexed or bent to the left and moves the servo piston 34 to the left. The servo piston 34 abuts the extension arm 19 of the switch piston 16 and moves said switch piston to the left, thereby unseating said switch piston from the pressure seal seat 18. The opening of the pressure seal of the pressure control chamber 17 results in a pressure release in the base block 15 through aperture 39 and a corresponding decrease of pressure in the first relay chamber 30. The resulting pressure difference between the relay chambers 24 and 30 displaces the diaphragm 27 to the right, the pressure seal seat 26 becomes unseated and a "1" pneumatic binary signal occurs and is maintained at the output conduit 28.

The binary "0" or "1" signals may then be further processed, as desired, in logical systems not shown in the figures.

In the embodiment of FIG. 2, a servo piston 34' is affixed to the servo diaphragm 32 and is movably mounted for axial movement in a guide 35'. A servo pressure chamber 37 is provided between the servo diaphragm 32 and the guide 35'. The guiding aperture of the guide 35' and the diameter of the servo piston 34 match closely one to another so that an airtight seal is insured in the servo pressure chamber 37. The guide 35 may be axially adjustable similarly as in the embodiment shown in FIG. 1 or an inlet conduit 38 opens into the servo pressure chamber 37.

The threshold level of the pneumatic threshold switch of FIG. 2 is thus pneumatically adjustable by variation of the pressure in the servo pressure chamber 37. The pressure in the servo pressure chamber 37 may be varied by any suitable means such as, for example, by varying the supply of air or gas to said chamber via the inlet conduit 38. The air or gas supplied to the servo pressure chamber 37 is preferably compressed air or gas. The air or gas supplied to the servo pressure chamber 37 functions, in the manner of the compression spring 36 of the embodiment of FIG. 1, to vary the force on the servo diaphragm which counteracts the force applied to said diaphragm by air or gas supplied to the servo chamber 31 via the inlet conduit 33.

The operation of the embodiment of FIG. 2 of the pneumatic threshold switch of the present invention is similar to that of the embodiment of FIG. 1.

What is claimed is:

1. A pneumatic threshold switch comprising
   a pneumatic pressure release switch for producing a pneumatic signal when actuated;
   a pneumatic servomotor positioned in spaced cooperative relation with said pneumatic pressure release switch, said servomotor comprising a housing, a servo chamber in said housing, a diaphragm in said servo chamber, a servo piston in said housing affixed to said diaphragm, a servo piston guide member movably arranged for axial adjustment in said housing, and threshold level adjusting means controlled from the outside of said housing for applying an adjustable threshold level force to the servo piston surface of said diaphragm;
   pressure input means in said servo chamber for applying a switch force on the surface of said diaphragm opposite that to which said threshold level force is applied in a manner whereby upon the magnitude of said switch force exceeding the magnitude of said threshold level force, said servo piston actuates said pneumatic pressure release switch and the latter switch produces a pneumatic binary signal.

2. A pneumatic threshold switch as claimed in claim 1, wherein said threshold level adjusting means comprises mechanical means in said housing and abutting said diaphragm for applying an adjustable mechanical threshold level force to the piston surface of said servo diaphragm.

3. A pneumatic threshold switch as claimed in claim 2, wherein said threshold level adjusting means comprises a spring in said housing and abutting said diaphragm for applying an adjustable threshold level force to the piston surface of said servo diaphragm.

4. A pneumatic threshold switch as claimed in claim 1, wherein said pneumatic servomotor comprises an airtight guide member for guiding said servo piston for axial movement, and wherein said threshold level adjusting means comprises an airtight pressure chamber on the piston side of said diaphragm for applying an adjustable pneumatic threshold level force to the servo piston surface of said diaphragm.

5. A pneumatic threshold switch as claimed in claim 1, wherein said threshold level adjusting means further comprises a pressure chamber on the piston side of said diaphragm between said guide and said diaphragm, and threshold pressure input means for applying an adjustable pneumatic threshold level force to the piston surface of said diaphragm via said pressure chamber, said threshold pressure input means providing adjustable threshold pressure.

6. A pneumatic threshold switch according to claim 1 wherein said pressure release switch comprises a base block and a pneumatic diaphragm relay, said base block comprising a branched pressure input conduit, a pressure control chamber, a pressure outlet passage, a pressure relief aperture, and a switching piston disposed for free axial movement within said control chamber to seal said pressure relief aperture when pressure is applied into said control chamber, one branch of said pressure input conduit communicating with said pressure outlet passage through said control chamber; said diaphragm relay having at least first and second relay chambers, said chambers being separated from each other by a relay diaphragm, said first relay chamber being connected with said pressure control chamber through said pressure outlet passage; output conduit means separated from said second relay chamber by a pressure seal seat controlled by said relay diaphragm, and the second branch of said pressure input conduit communicating with said second relay chamber.

* * * * *